(12) United States Patent
Koller et al.

(10) Patent No.: US 11,117,470 B2
(45) Date of Patent: Sep. 14, 2021

(54) MULTIFUNCTION DEVICE AND DASHBOARD WITH SUCH A DEVICE

(71) Applicant: MOTHERSON INNOVATIONS COMPANY LIMITED, London (GB)

(72) Inventors: Matthias Koller, Stuttgart (DE); Romeo Wieczorek, Stuttgart (DE)

(73) Assignee: Motherson Innovations Company Limited, London (GB)

(*) Notice: Subject to any disclaimer, the term of this patent is extended or adjusted under 35 U.S.C. 154(b) by 82 days.

(21) Appl. No.: 16/409,004

(22) Filed: May 10, 2019

(65) Prior Publication Data
US 2019/0344664 A1    Nov. 14, 2019

(30) Foreign Application Priority Data

May 11, 2018    (DE) ...................... 10 2018 111 344.7

(51) Int. Cl.
| | | |
|---|---|---|
| *B60K 37/02* | (2006.01) | |
| *B60R 21/015* | (2006.01) | |
| *G06K 9/00* | (2006.01) | |

(52) U.S. Cl.
CPC ........ *B60K 37/02* (2013.01); *B60R 21/01552* (2014.10); *G06K 9/00845* (2013.01);
(Continued)

(58) Field of Classification Search
CPC ........ B60K 2370/149; B60K 2370/152; B60K 2370/1529; B60K 2370/27; B60K 2370/28; B60K 2370/67; B60K 2370/682; B60K 2370/691; B60K 2370/693; B60K 2370/816; B60K 37/02; B60K 37/04; B60R 21/01552; G06K 9/00845
See application file for complete search history.

(56) References Cited

U.S. PATENT DOCUMENTS 3,602,187 A * 8/1971 Lambiris ................. F16H 63/42
116/28.1
4,194,587 A * 3/1980 Shino ..................... B60K 37/02
116/62.4
(Continued)

FOREIGN PATENT DOCUMENTS

| DE | 202014007673 U1 | 2/1916 |
|---|---|---|
| DE | 10212944 A1 | 10/2002 |

(Continued)

OTHER PUBLICATIONS

German Office Action dated Nov. 19, 2018 of application DE 10 2018 111 344.7.
(Continued)

*Primary Examiner* — Laura Freedman
(74) *Attorney, Agent, or Firm* — Jones Day

(57) ABSTRACT

A multifunction device for a motor vehicle with a combustion engine or an electric drive includes at least one display device and at least one functional element, where the functional element is arranged in such a way in front of the display device at least area by area with respect to a display direction of the display device in that the functional element at least in a first area of the display device covers the display device along a normal direction of at least area by area the display device, as well as a dashboard with such a multifunctional device.

13 Claims, 1 Drawing Sheet

(52) U.S. Cl.
CPC .... *B60K 2370/149* (2019.05); *B60K 2370/67* (2019.05); *B60K 2370/816* (2019.05)

(56) References Cited

U.S. PATENT DOCUMENTS

| | | | | |
|---|---|---|---|---|
| 5,305,014 | A * | 4/1994 | Mutschler | B60H 1/00985 340/461 |
| 5,361,165 | A * | 11/1994 | Stringfellow | B60K 37/02 340/461 |
| 5,406,303 | A * | 4/1995 | Salmon | B60K 35/00 345/75.1 |
| 6,719,343 | B2 * | 4/2004 | Emerling | B60N 3/101 296/24.34 |
| 7,198,393 | B2 * | 4/2007 | Tubidis | B60K 35/00 362/489 |
| 7,382,237 | B2 * | 6/2008 | Stoschek | B60K 35/00 340/438 |
| 7,508,381 | B2 * | 3/2009 | Matsumura | B60K 35/00 345/173 |
| 7,511,683 | B2 * | 3/2009 | Sumiyoshi | B60K 37/02 345/7 |
| 8,025,327 | B1 * | 9/2011 | Schowalter | B60K 37/00 296/70 |
| 8,878,660 | B2 * | 11/2014 | Konet | B60K 37/06 340/438 |
| 9,272,671 | B2 * | 3/2016 | Vander Sluis | B60K 37/04 |
| 9,684,392 | B2 | 6/2017 | Kamiyama et al. | |
| 9,731,602 | B2 | 8/2017 | Kim et al. | |
| 9,751,461 | B2 * | 9/2017 | Vourlat | B60Q 3/82 |
| 9,927,609 | B2 * | 3/2018 | Cammenga | G03B 21/604 |
| 10,351,001 | B2 * | 7/2019 | Beauregard | B60K 35/00 |
| 10,759,279 | B2 * | 9/2020 | Iwao | B60K 37/02 |
| 2005/0119799 | A1 | 6/2005 | Dupont et al. | |
| 2009/0201436 | A1 * | 8/2009 | Strazzanti | B60K 37/06 349/16 |
| 2015/0084886 | A1 | 3/2015 | Kamiyama et al. | |
| 2016/0193924 | A1 | 7/2016 | Kim et al. | |
| 2018/0107320 | A1 | 4/2018 | Im et al. | |

FOREIGN PATENT DOCUMENTS

DE 102004014628 A1 10/2005
DE 102014009609 A1 12/2014

OTHER PUBLICATIONS

French Search Report dated Oct. 13, 2020 of application FR 1904835.

* cited by examiner

MULTIFUNCTION DEVICE AND DASHBOARD WITH SUCH A DEVICE

CROSS-REFERENCE PARAGRAPH

This application claims the benefit of foreign priority to German Patent Application No. DE 10 2018 111 344.7, filed May 11, 2018, which is hereby incorporated by reference in its entirety for all purposes.

BACKGROUND

1. Field of the Invention

The present disclosure relates generally to a multifunction device for a vehicle and a dashboard for a vehicle with such a multifunction device.

2. Background of Related Art

In modern vehicles, more and more information is displayed to the driver on monitors or displays. Due to the increasing amount of information, there is a tendency to recognize that larger and larger areas, especially the surface, of dashboards in vehicles are taken by such displays or monitors.

If the corresponding display devices are too small, the corresponding information cannot be displayed clearly or conveniently to a driver. For example, maps of a navigation system are displayed too small and therefore difficult for the driver to decipher. On the other hand, the enlargement of the monitors or displays means that less and less space is available for other functional elements of the vehicle, such as ventilation slots for an air conditioning system or other control elements.

SUMMARY

In an aspect, a human/machine interface enables a driver of a vehicle to be provided with a largest possible display area for the convenient display of information and at the same time provides sufficient space for functional elements beyond this, such as further interfaces.

In an aspect, the following disclosure describes a multifunction device for a vehicle, in particular a motor vehicle with combustion engine and/or electric drive, comprising at least one display device and at least one functional element, wherein the functional element is arranged at least area by area in front of the display device with respect to a display direction of the display device in that the functional element at least in a first area of the display device covers the display device at least area by area along a normal direction of the display device.

It is particularly preferred here that the functional element comprises at least area by area at least one air-conditioning device, such as an air outlet, an outlet nozzle and/or air intake opening, at least one operating element, such as a switch, a push-button, a rotary switch, a toggle switch and/or a selector lever, at least one shelf, such as a drawer, a niche and/or a cup holder, at least one, in particular electrical, socket, at least one display device, at least one lighting device and/or at least one camera device.

An multifunctional device according to the invention can also be characterized in that at least one housing device which is preferably of step-shaped design at least area by area, wherein the functional element is accommodated at least area by area in the housing device and/or the housing device covers the display device at least area by area in the first area along the normal direction.

Furthermore, with the disclosure it is suggested that the functional element and/or the housing device is or are movably mounted, in particular foldable, translatory and/or rotatory, that the first area can be released in the normal direction.

It is also preferred that the functional element and/or the housing device is so spaced from the display device that at least one interspace is formed between the display device and the functional element and/or the housing device.

The aforementioned multifunction device can furthermore be characterized by at least one cover, wherein the cover is arranged at least area by area in the interspace, covering at least area by area the first area, covering at least area by area the interspace at least area by area and/or delimiting at least area by area the interspace.

For the aforementioned embodiment it is particularly preferred that the cover extends at least area by area inclined to the surface of the display device, in particular parallel to the normal direction.

For the two aforementioned embodiments, it is proposed that the cover be transparent and/or semitransparent at least area by area and/or that the transparency of the cover be modifiable at least area by area, preferably by means of at least one electrochromic effect.

Furthermore, a multifunctional device in accordance with the disclosure may be characterized by at least one lighting device arranged below the cover and/or in the interspace.

The disclosure also proposes at least one control and/or regulating device which is operatively connected to the display device, the functional element, the housing device and/or the cover.

In this embodiment it is particularly preferred that a modification of the multifunction device can be carried out by means of the control and/or regulating device, in particular a display in the first area of the display device can be turned on, turned off and/or switched on, an region of the first area of the display device in which information is displayed can be modified, in particular in size and/or form, the transparency of the cover can be modified, a brightness of the display can be modified in the first area of the display device and/or in at least one second area of the display device which lies outside the first area, the housing device and/or the functional element can be moved, preferably by means of an actuator which is operatively connected to the regulating and/or control device, or and/or a brightness of the lighting device can be modified.

For the multifunction device according to the disclosure, it is further proposed to use at least one sensor device, wherein the sensor device is preferably operatively connected to the display device, the functional element, the housing device, the cover and/or the control and/or regulating device and/or by means of measurement data generated and/or output by the sensor device the multifunction device can be modified.

Finally, it is preferred for the aforementioned embodiment that the sensor device comprises at least one sensor for detecting at least one viewing direction, at least one viewing angle, at least one position, at least one seating position and/or at least one viewing position of at least one part of a person, in particular a driver of the vehicle and/or a front passenger or passenger, at least one temperature sensor and/or at least one motion sensor.

Furthermore, the disclosure provides a dashboard for a vehicle, in particular a motor vehicle with combustion engine and/or electric drive, comprising at least a part of a multifunctional device according to the disclosure.

The disclosure is thus based on the surprising finding that by providing a multifunction device comprising at least a display device and a functional element, an improved human/machine interface can be provided for a vehicle. Thus, this multifunction device has the advantage that a comparatively large display can be used to provide the largest possible display area for information to a driver. The first area of the display is always covered by the functional element. It is preferred that the functional element is arranged in a housing device, in particular in the form of a step. The functional elements include, in particular, operating comfort elements, ventilation slots and the like.

In particular in situations in which the vehicle is in motion, a second area of the display device outside the first area is usually sufficient for the display of information. Since this area is not covered by the functional device or the housing device, the necessary information can be presented via this second area to the driver from any viewing direction on the display device and the covered first area can remain inactive/black. If a larger screen area is required or desired, the first area, which is partially covered by the functional device, can be switched to active. This makes it possible, for example, to display films or maps in large format in order to make them easier to recognize and read.

The view onto the first area can be made possible by folding away the functional element or the housing element, in particular automatically. The functional device or housing device can also be arranged and shaped in such a way that a interspace is created between the display device and the functional device or housing device. The driver or vehicle occupant can then, for example, look at the first area of the display device from diagonally above behind the functional device or housing device. The first area of the display device for radiating trough the cover, which comprises plexiglass for example, may have a higher brightness than the second area.

It is preferable that the interspace between the functional device and the display device is covered by a cover. This cover can be designed to be semi-transparent so that in the case of an inactive first area of the display equipment, a view at this area of the display equipment is prevented and the passenger's interest is directed to the uncovered second area of the display equipment. However, if the first area of the screen is activated, the occupant will be able to look through the cover and see the information displayed in the first area of the display.

As functional elements, the most diverse elements of a motor vehicle can be considered, such as operating elements, shelves, sockets or other display or lighting equipment. The supply lines that may be required for these functional elements can be integrated into the housing device.

The cover described previously can also be modified. In addition to a movable cover, by means of which an unobstructed view of the first area of the display device is achieved, the transparency of the cover device can also be modified. An electrochromic effect is particularly suitable here. By applying a voltage to the cover, it can then be switched in transparently, especially if the first area of the display device is not in function or the driver should not be distracted by information displayed in this area. On the other hand, it can be switched transparently if information is displayed in the first screen area.

In order to avoid disturbing reflections on the cover or to outshine them, it may be provided that the display device has an increased brightness at least in the first area, or an lighting device may be arranged below the cover, by means of which the display device is additionally illuminated in the first area in order to facilitate recognisability of the information presented in this area.

The multifunction device is preferably influenced by a control or regulating device. In particular, this control and/or regulation device enables the display of information in the respective areas of the display device to be controlled and the functional elements or the housing device to be moved. It is particularly preferred that the control and/or regulation device carries out corresponding signals based on measured data recorded by a sensor device. It is conceivable that an automatic seat position detection with eye point is achieved via a sensor device, for example a TOF sensor array. A head recognition or position software and infrared LEDs and/or an eye tracking system can also be used.

In particular, automatic eye recognition enables, depending on the user's viewing angle, the display device's display to be enabled in the first area to such an extent that an observer can see the areas of the display not covered by the functional device or housing device from the respective viewing direction. In particular, this makes it possible for the respective screen area to be displayed on the information, to be adapted to the respective viewing direction or seating position, i.e. in particular only an region of the first area is used for displaying the information, while a part of the first area covered by the functional element, in particular from the respective viewing direction, remains inactive. The viewable region can be determined from the eye position, which results from the trigonometric function of height, distance and position of the eye relative to the display device. Monitors with increased luminous intensity and/or those that can be cooled from their rear side are used as display devices in particular, as the heat dissipation on the step or side facing the functional element may be restricted.

In summary, the disclosure thus provides a multifunctional device which, despite the aforementioned functional elements or housing devices in which functional elements are arranged, enables the largest possible area of a display device to be used. It also allows display devices with a larger effective viewing area to be embedded in shapely designs, while still giving the feeling that the dashboard is not just a display device.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION

Figure 1:
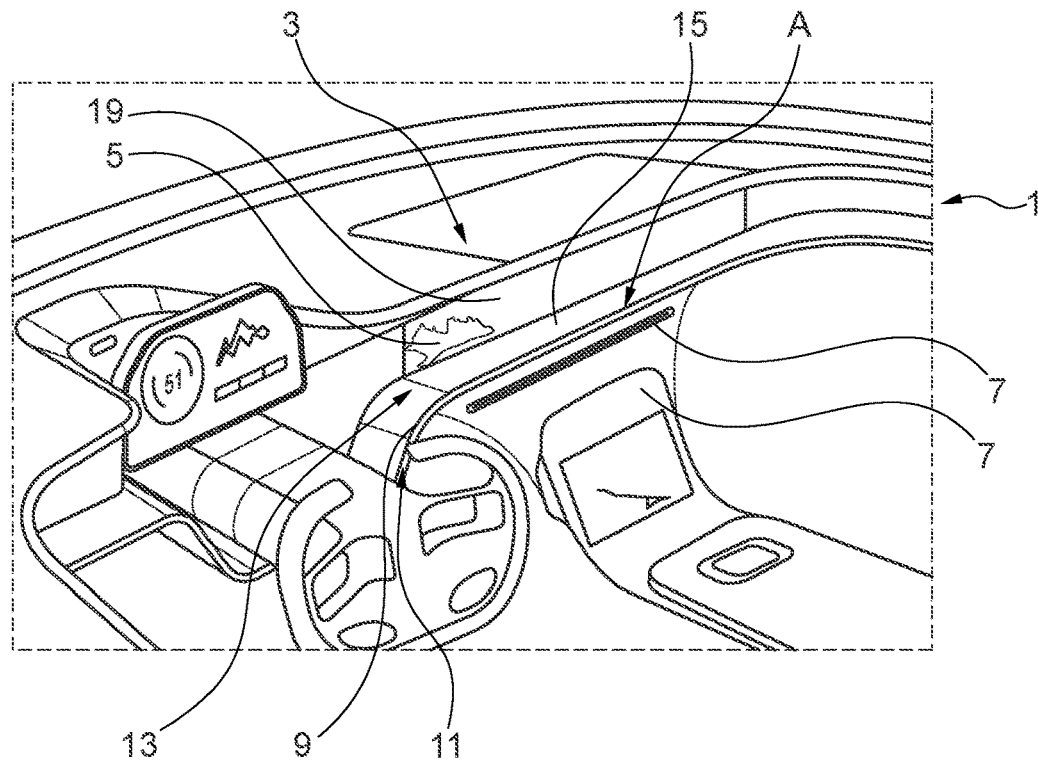
FIG. 1 is a schematic representation of an example of a dashboard with a multifunction device.

FIG. 1 shows a dashboard 1 with a multifunction device 3 according to the disclosure. As shown in FIG. 1, the multifunction device comprises a display device 5 and a plurality of functional elements 7 arranged in a housing device 11 designed as an upstream step 9. As can be seen in FIG. 1, the display device 5 is spaced from step 9 by a distance A. The distance A creates an interspace 13. This interspace 13 is covered by a cover 15 illustrated in FIG. 1 as in transparent. In alternative embodiments, it may be provided that the cover is arranged in the interspace 13. Below the cover 15, a first area 17 of the display device 5 is arranged. This area 17 is covered by the functional elements 7 or step 9. FIG. 1 also shows that a second area 19 of the display device 5 is present outside the first area. This second area 19 is uncovered by the functional devices 7 or step 9 and can therefore be viewed from any direction.

Figure 2:
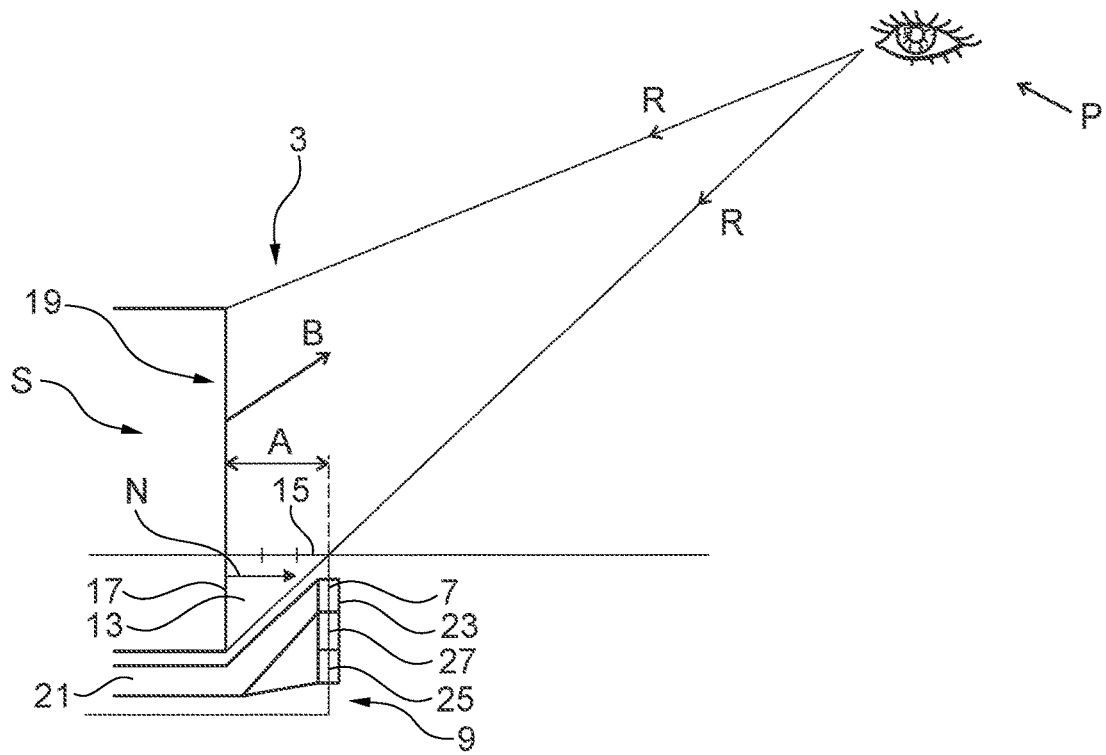
FIG. 2 is a schematic cross-sectional view of an example of the multifunction device of FIG. 1.

FIG. 2 shows a schematic cross-sectional view of the multifunction device 3. As can be seen from FIG. 2, step 9 covers the first area 17 of the display device 5 in a normal direction N. The first area is the area of the display device 5 in a normal direction N. If an observer now looks from diagonally above along the viewing direction R in the direction of the display device 5, the cover 15 prevents the observer from seeing the first area 17 of the display device 5. If the first area 17 of display device 5 is now activated, the information can be viewed through the semi-transparent cover 15. This can be supported by the fact that the cover 15 is designed to be switchable, i.e. can be switched from non-transparent to transparent, in order to enable a view of the first area 17 of display device 5.

The cover 15 is switched, in particular, by a control or regulating device which is not shown, depending on a detected viewing direction R or viewing position P of a viewer. Depending on this viewing position P and the resulting visibility of the display device 5, the sizes of the areas 17 and 19 in which information is presented are adjusted so that these areas can be viewed by the user or viewer. In particular, only a region of the first area 17 visible to the viewer will be activated. Outlet nozzles 23 supplied with air via a canal 21 integrated in step 9, lighting devices 25 or switches 27 can be considered as functional element 7. In this way, the multifunction device according to the disclosure enables the best possible balance to be achieved between the size of the monitors and display devices available for displaying information on the one hand and the provision of further functional elements within the vehicle on the other.

The features disclosed in the preceding description in the claims and drawings may be essential to the disclosure in its various forms, either individually or in any combination.

REFERENCE LIST

1 Dashboard
3 Multifunction device
5 Display Device
7 Functional element
9 Step
11 Housing device
13 Interspace
15 Cover
17 area
19 area
21 Canal
23 Outlet nozzle
25 Lighting device
27 Switches
A Distance
B Display direction
N Normal direction
R Viewing direction
P Viewing position

What is claimed is:

1. A multifunctional device for a motor vehicle, comprising:
   a display device having a first area and a second area;
   a functional element, wherein the functional element is arranged in front of the display device with respect to a display direction of the display device; in that the functional element covers the display device at a first area, and wherein the functional element is spaced from the display device so that an interspace is formed between the display device and the functional element;
   a cover; and
   a housing device having a step-shaped portion,
   wherein the cover is arranged in the interspace, covering the first area, covering the interspace, or delimiting the interspace,
   wherein the cover is semitransparent or the transparency of the cover is modifiable,
   wherein the functional element is accommodated in the housing device and the housing device covers the display device in the first area along a normal direction of the display device,
   wherein the second area of the display device is outside the first area so that the second area of the display device is not covered by the functional element or the step-shaped portion of the housing device and can therefore be viewed, and
   wherein, in response to the first area being inactive, the first area of the display device is blocked by the cover and not visible along direction of the display device, and in response to the first area being active, the first area is visible through the cover which is semitransparent or has a modifiable transparency, and
   wherein the cover forms a top surface of the housing device, and the functional element is formed separately from the cover without being directly on the cover.

2. The multifunction device according to claim 1, wherein the functional element comprises at least one air-conditioning device including at least one of an air outlet, an outlet nozzle, and air intake opening, at least one operating element including at least one of a switch, a push-button, a rotary switch, a toggle switch, and a selector lever, at least one shelf including at least one of a drawer, a niche, and a cup holder, at least one electrical socket, at least one display device, at least one lighting device, and/or at least one camera device.

3. The multifunction device according to claim 1, wherein the functional element is movably mounted, wherein the movement is at least one of folding, translating, and rotating, so that the first area can be uncovered in the normal direction.

4. The multifunction device according to claim 1, wherein the housing device is movably mounted wherein the movement is at least one of folding, translating, and rotating, so that the first area can be uncovered in the normal direction.

5. The multifunction device according to claim 1, wherein the housing device is spaced from the display device so that at least one interspace is formed between the display device and the housing device.

6. The multifunction device according to claim 5, further comprising at least one lighting device arranged below the cover or in the interspace formed between the display device and the housing device.

7. The multifunction device according to claim 1, wherein the cover extends in an incline relative to a surface of the display device and parallel to the normal direction.

8. The multifunction device according to claim 1, wherein the transparency of the cover can be modified by at least one electrochromic effect.

9. The multifunction device according to claim 1, further comprising at least one control or regulating device which is operatively connected to the display device, the functional element, the housing device, or the cover.

10. The multifunction device according to claim 9, wherein a modification of the multifunction device can be carried out using at least one control or regulating device, the modification being selected from a group comprising at least one of a display in the first area of the display device can be turned on or turned off, a region of the first area in which information is displayed can be modified in size and shape, the transparency of the cover can be modified, a brightness of the display can be modified in at least one of the first area or the second area of the display device at least one of the housing device or the functional element can be moved using an actuator, which is operatively connected to the at least one control or regulating device control or regulating, and a brightness of a lighting device can be modified.

11. The multifunction device according to claim 1, further comprising at least one sensor device, wherein the sensor device is operatively connected to the display device, the functional element, the housing device, and/or a control or regulating device, and wherein the multifunction device can be modified using measurement data generated or output by the sensor device.

12. The multifunction device according to claim 11, wherein the sensor device comprises at least one sensor for detecting at least one viewing direction, at least one viewing angle, at least one position, at least one seating position, at least one viewing position, at least one temperature sensor and/or at least one motion sensor.

13. A dashboard for a motor vehicle with at least one of a combustion engine and an electric drive comprising a multifunction device according to claim 1.

* * * * *